Aug. 18, 1931.   H. WOCHNER   1,819,311
AXLE STRAIGHTENING MECHANISM
Filed May 6, 1929   2 Sheets-Sheet 1

INVENTOR.
Henry Wochner.
BY Walter N. Haskell
his ATTORNEY.

Aug. 18, 1931. H. WOCHNER 1,819,311
AXLE STRAIGHTENING MECHANISM
Filed May 6, 1929 2 Sheets-Sheet 2
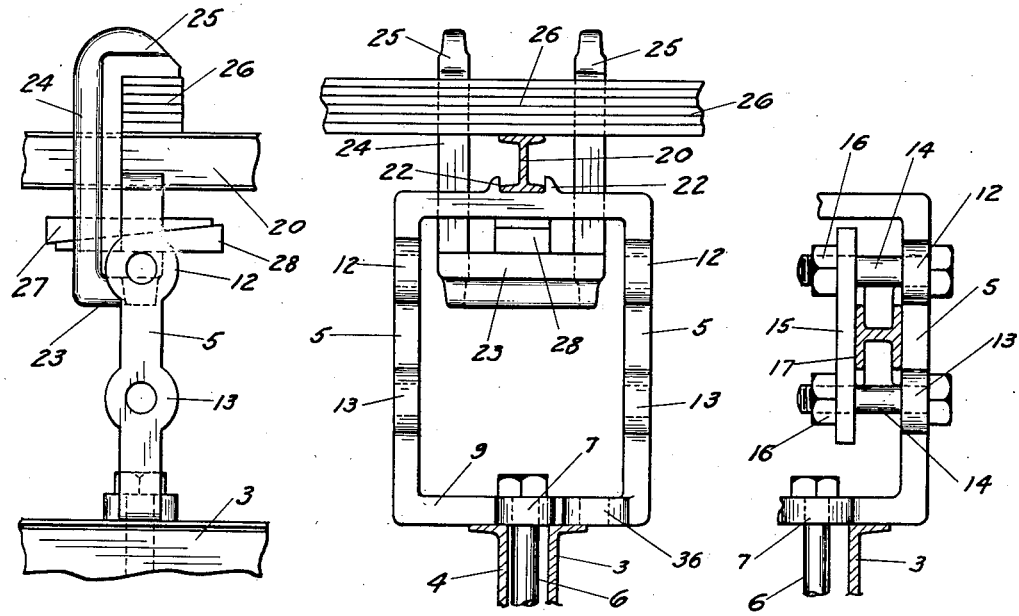
FIG-4  FIG-5  FIG-6
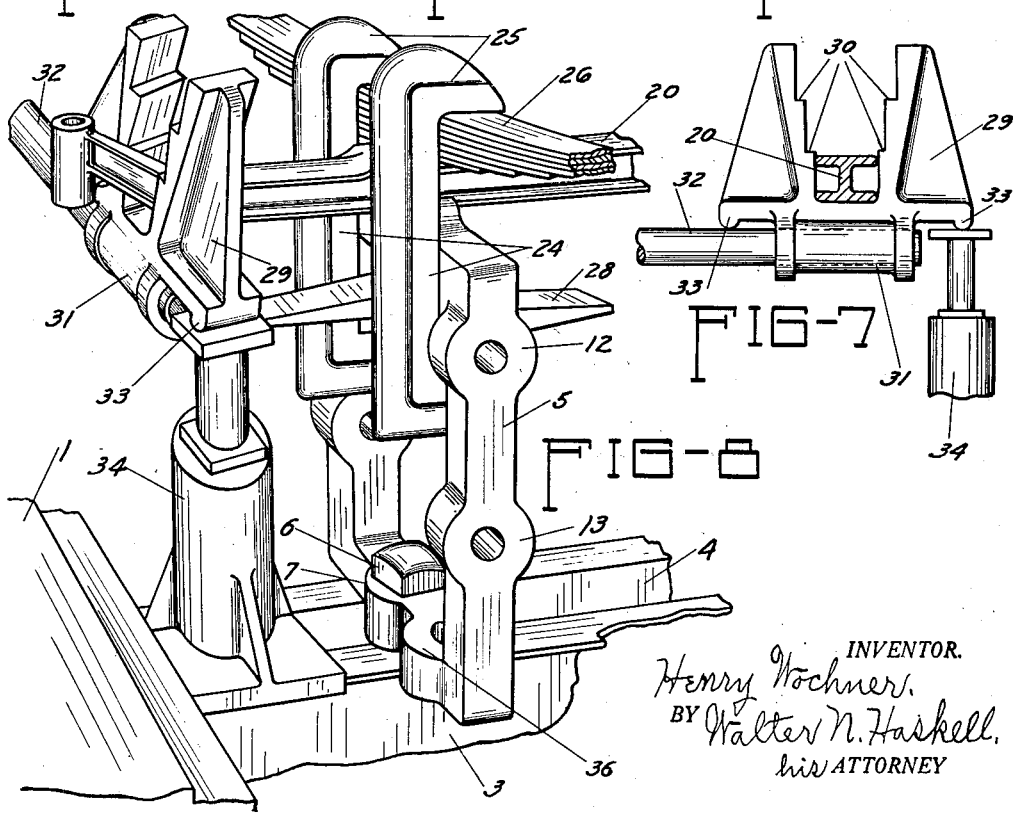
FIG-7
FIG-8
INVENTOR.
Henry Wochner,
BY Walter N. Haskell,
his ATTORNEY Patented Aug. 18, 1931

1,819,311

UNITED STATES PATENT OFFICE

HENRY WOCHNER, OF ROCK ISLAND, ILLINOIS, ASSIGNOR TO BEAR MANUFACTURING COMPANY, OF ROCK ISLAND, ILLINOIS

AXLE STRAIGHTENING MECHANISM REISSUED

Application filed May 6, 1929. Serial No. 360,662. JAN 1 7 1933

My invention has reference to a tire straightening device, and is of the same class as the automobile axle press for which I filed application for Letters Patent of the United States on the twenty-first day of December, 1928, Serial No. 327,643. The purpose of the present invention is largely similar to that of the one shown in said former application, and it is intended for use with a heavy cross-beam or other fixture, preferably with a pit or other space beneath it to facilitate the manipulation of the device.

One of the objects of the present invention is to provide an attachment for a beam of the kind named which will provide a substantial holding frame or vise, by means of which an axle can be held in immovable position while it is being bent or twisted. The correction of a fault in the axle can also be made without heating the axle, and in most cases without removing the same from the motor vehicle.

Another purpose of the invention is to provide a mechanism which is capable of a quick set-up, when being applied to an axle, and which, except in special cases, does not require the use of bolts or similar fastening means, excepting those by the use of which the device is rigidly supported on a beam, and which only require to be manipulated in case of a desired adjustment thereof on the beam. It can be as quickly disconnected and taken apart after being used.

The above named and other features and advantages of the invention will more fully appear from the following specification, taken in connection with the accompanying drawings, in which; —

Fig. 4 is an enlarged detail of the vise mechanism in side elevation.

Fig. 5 is a similar front elevation.

Fig. 6 is a partial section along the broken line 6—6 of Fig. 2.

Fig. 7 is a detail view of the cradle 30.

Fig. 8 is a perspective view of the vise mechanism and twisting tool, in detail.

On account of the length of an ordinary axle it is found to be necessary to make use of two of the devices for holding the same, one near each end of the axle. This arrangement is shown in the first three figures of the drawings, and said mechanisms are similarly constructed and operated, so that the description of one thereof will be understood to relate to the other one also.

Figure 1:
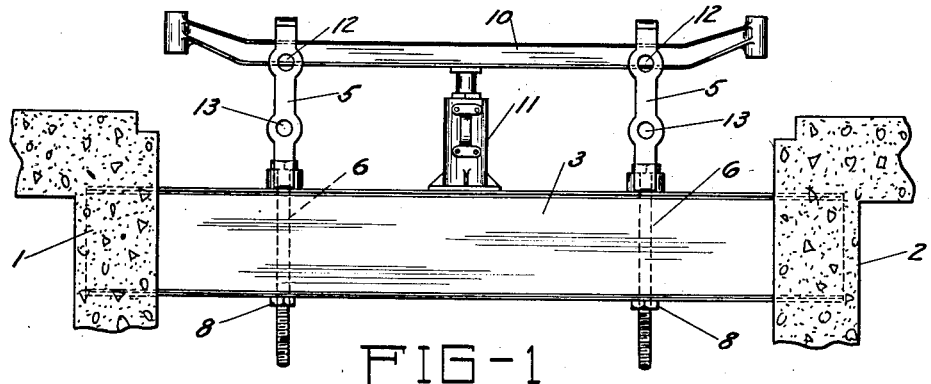
Fig. 1 shows the invention in use in its simple form, for correcting a bend in an axle in a vertical plane, with the axle detached from the vehicle.

In said first three figures the device is shown in connection with a pit, having side walls 1 and 2, in which are imbedded the ends of a cross-beam, formed of a pair of spaced channel-plates 3 and 4. Mounted transversely of the beam is an oblong frame 5, secured to said beam by a bolt 6 passing downwardly through the space in the beam and through an eye 7 in the lower bar 9 of said frame, and provided on its lower threaded end with a nut 8. The frame 5 is thereby rigidly connected with said beam. In Fig. 1 an axle 10 is shown in position beneath the upper bars of two of the frames 5, and supported at a central point by a jack 11, which may be of any known construction. By upward pressure being applied by said jack the central portion of the axle can be bent upwardly to correct a faulty curvature therein. By inverting the axle the force can be applied to bend it in the opposite direction.

Figure 2:
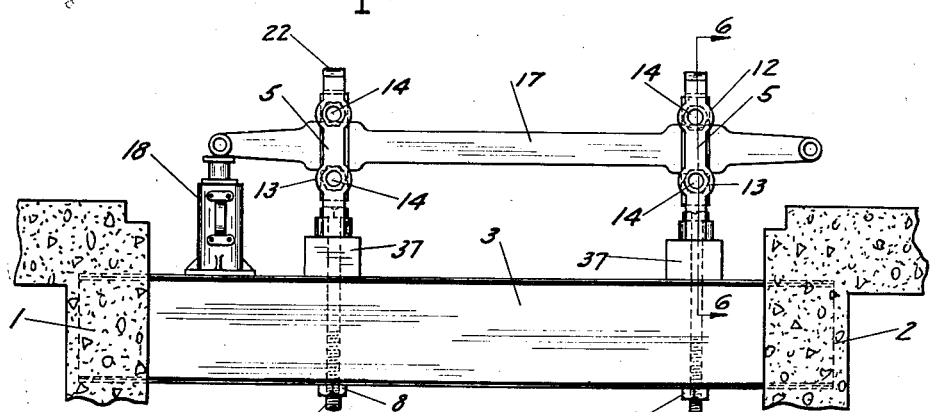
Fig. 2 is a similar view, showing the invention in use for correcting a bend in the axle in a horizontal plane.

In Fig. 2 an axle 17 is shown supported sideways against one of the side plates of the frames 5, said plates being provided with openings 12 and 13 through which pass bolts 14, supporting shackle-plates 15, which are clamped tightly against the axle 17 by means of nuts 16 on the threaded ends of said bolts. (Fig. 6.) Force can then be applied either to the center or ends of the axle by means of a jack, to bring the body of the axle or either end thereof back into proper alignment. In Fig. 2 a jack 18 is shown positioned on the beam 3—4, beneath one end of the axle 17.

Figure 3:
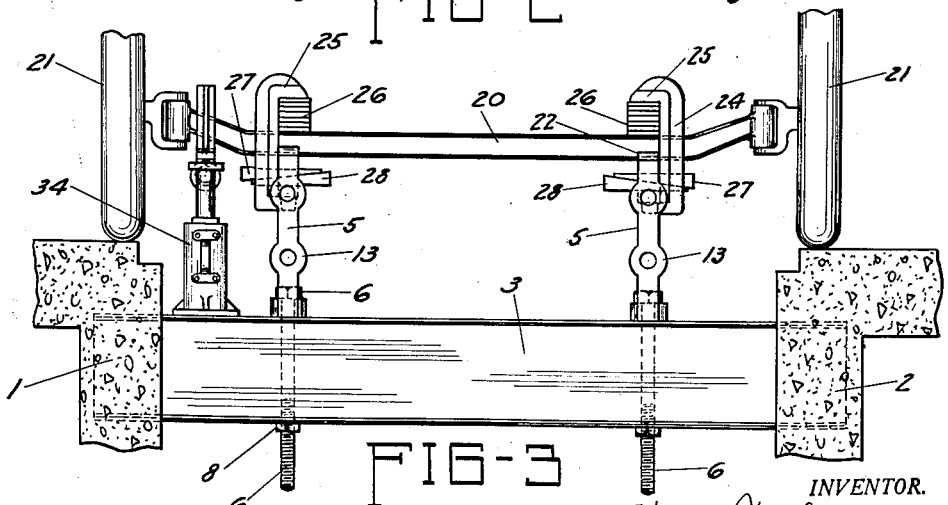
Fig. 3 shows the complete mechanism, with an axle in position therein for correcting a twist in the axle with the axle in position in the vehicle.

In Fig. 3 is shown an axle 20, provided on its ends with wheels 21, which rest upon the floor at the sides of the pit. The axle is supported at each and on top of one of the frames 5, and is held from side movement by pairs of lugs 22 on the upper bar of the frame. (Fig. 5.) The axle is held from movement by means of auxiliary frames, each comprising a cross-bar 23 and pair of arms 24 projected upwardly therefrom, and provided at their ends with hooks 25, which engage the upper faces of the springs 26 of the vehicle. When thus positioned there is a space between the bar 23 and the upper bar of the frame 5, into which a pair of wedges 27 and 28 is driven, in opposite directions, with the effect of spreading said bars and clamping the spring 26 and axle 20 tightly in place. While thus held immovably in position force can be applied to the end of the axle to reduce any twist or tort therein. A mechanism for accomplishing this is more particularly shown in Figures 7 and 8, and consists of a cradle 29, capable of receiving one end of the axle 20, and provided with additional axle seats 30, to accommodate axles of greater sizes. At its lower side the cradle 29 is provided with a socket 31 in which is inserted one end of a bar 32. At each end of the cradle is a bearing point 33, by means of which one end or the other is supported on the jack 34, permitting a rocking movement to the tool. By applying an upward force by means of the jack and at the same time bearing down upon the bar 32 the cradle 29 is tilted, and the desired amount of twist given to the axle. If the twist is to be given in the opposite direction the position of the bar is reversed in the socket and the jack positioned beneath the other bearing point 33.

When the auxiliary frame is used the axle is held as in a vise, and while thus held any of the bending or twisting operations may be performed thereon. It is always essential that the jack shall have a substantial support on the beam, and in some cases when the twisting tool is being used it is necessary to support the axle a little to one side of the beam. To do this the bolt 6 is positioned in an extra eye 36 at one end of the bar 9, which results in the greater part of the frame and axle supported thereby being held at one side of the beam. The jack can usually be supported on the beam member on the side opposite to that on which the axle is held.

In some cases where the length of the frames 5 would cause the axle to be supported at too great a height above the cross-beam said frames can be turned on their sides, and the bolts 6 passed through some of the openings in the side pieces. In other cases where it is desired to increase the spacing between the axle and the beam, the frames 5 can be supported on blocks 37, (Fig. 2) with the bolts 6 passing through perforations in the blocks. A different positioning of the axle with reference to the frames can also be secured by projecting the bolts 14 outwardly and supporting the shackle plates 15 on the outside of the frames. By the various adjustments of position of which the device is capable it can be readily accommodated to axles of different makes, and to the various positionings of such axles above the cross-beam. If an axle is subject to two or more defects, all of these can be corrected while it is in position in the vise.

After an axle has been operated upon while held in place by the auxiliary frames, it can be quickly released by driving out the wedges 27 and 28 and removing said frames. If the frames 5 are also removed, together with the jack, there is nothing above the floor to interfere with the movement of a vehicle above the pit. In replacing the frames 5 they can be adjusted in position with relation to each other or the ends of the beam.

The drawings herein illustrate the preferred embodiment of the invention, the possibility of changes in the form and arrangement of some of the parts being obvious.

What I claim, and desire to secure by Letters Patent, is:

1. In combination with a fixed beam, a rectangular frame supported thereon, and rigidly connected therewith, an auxiliary frame including hooked ends for engagement with the axle structure of an automobile, and having a cross-bar spaced from the upper cross-bar of the first-named frame when thus engaged, and means for spreading said bars to cause a rigid clamping of the axle structure to said frame.

2. In combination with a rigidly mounted beam, a rectangular frame having an axle seat on its upper bar and provided with two or more bolt openings in its lower bar, a bolt connecting said frame with said beam, and an auxiliary frame adapted to hold an axle rigidly in said seat.

3. In combination with a fixed beam, comprising a pair of spaced plates, a rectangular frame, provided with an axle seat on its upper bar, a bolt connected with said frame, and held adjustably in the space in said beam, an auxiliary frame provided with means for engagement with the spring of an automobile, and having a part spaced from the upper bar of said first-named frame, and a pair of wedges oppositely disposed between said part and said upper bar to force the same apart.

4. In combination with a fixed beam having a longitudinal channel, a pair of axle vises bolted thereto and adjustable longitudinally thereof, each of said vises consisting of a fixed frame for the support of an axle and an auxiliary frame for engagement with the axle structure, and means for imparting movement to the auxiliary frame relatively to the fixed frame to clamp the axle tightly against the fixed frame.

5. In combination with a fixed beam having a longitudinal channel, a bolt held adjustably in said channel, an axle vise supported on said beam and secured thereto by said bolt, said vise consisting of a fixed frame and an auxiliary frame, engageable with an axle structure, and means for movement of the auxiliary frame to cause the same to hold an axle tightly against the fixed frame.

6. In combination with a fixed beam and an axle clamping mechanism mounted thereon, and rigidly attached thereto, a power jack supported on said beam, a cradle provided with a plurality of axle holds of varying widths, for engagement with the end of an axle held in said clamping mechanism, and having a bearing point on one end for engagement by said jack, and a bar connected with said cradle, and projected in the opposite direction from the bearing point.

7. In combination with a fixed beam, a frame supported on said beam and laterally adjustable thereof, an auxiliary frame adapted for engagement with the axle structure of an automobile, means for actuating said auxiliary frame to clamp an axle rigidly upon said first-named frame, a cradle engageable with the end of an axle held by said frames, provided with bearing points on both sides of such axle, a power jack mounted on said beam, and engaging one of said bearing points, and a bar secured to said cradle, projecting oppositely to said jack, and capable of being reversed in position.

In testimony whereof I affix my signature.

HENRY WOCHNER.